United States Patent
Huang et al.

(10) Patent No.: US 9,417,444 B2
(45) Date of Patent: Aug. 16, 2016

(54) USER-FRIENDLY WIRELESS FIBER OPTIC ENDFACE INSPECTOR

(71) Applicant: LIGHTEL TECHNOLOGIES, INC., Renton, WA (US)

(72) Inventors: Shangyuan Huang, Kent, WA (US); Hsuan Chieh Chang, Bonney Lake, WA (US); Ge Zhou, Renton, WA (US); Pai-Sheng Shen, Bellevue, WA (US)

(73) Assignee: LIGHTEL TECHNOLOGIES, INC., Renton, WA (US)

( * ) Notice: Subject to any disclaimer, the term of this patent is extended or adjusted under 35 U.S.C. 154(b) by 754 days.

(21) Appl. No.: 13/875,214

(22) Filed: May 1, 2013

(65) Prior Publication Data
US 2014/0327756 A1    Nov. 6, 2014

(51) Int. Cl.
| | |
|---|---|
| *H04N 7/18* | (2006.01) |
| *G02B 21/36* | (2006.01) |
| *G02B 21/06* | (2006.01) |
| *G01M 11/00* | (2006.01) |

(52) U.S. Cl.
CPC .............. *G02B 21/365* (2013.01); *G01M 11/31* (2013.01); *G02B 21/06* (2013.01)

(58) Field of Classification Search
CPC ........ H04N 7/18; G01M 11/30; G01M 11/33; G01M 11/3109; G01M 11/3172; G02B 21/06; G02B 21/22; G02B 21/365; G02B 21/364; G02B 21/361

USPC .............. 348/79, 80; 382/141, 152; 359/369; 356/73.1
IPC ........................................................ H04N 7/18
See application file for complete search history.

(56) References Cited

U.S. PATENT DOCUMENTS

| | | | | |
|---|---|---|---|---|
| 9,217,688 B2 * | 12/2015 | Levin | ..................... | G01M 11/30 |
| 2003/0179447 A1 * | 9/2003 | Cassady | ............. | G02B 21/0016 |
| | | | | 359/391 |
| 2011/0085159 A1 | 4/2011 | Levin et al. | | |

* cited by examiner

*Primary Examiner* — Sherrie Hsia
(74) *Attorney, Agent, or Firm* — Pai Patent & Trademark Law Firm; Chao-Chang David Pai (57) ABSTRACT

A wireless fiber optic endface inspector includes a video microscope capable of wirelessly transmitting video streaming signal of endface image in real-time to a display device. The video microscope includes a microscope optical system, an adapting tip for interfacing an endface, an LED light source, a camera module for receiving and converting the endface image into video streaming signal, a Wi-Fi AP board, and a battery for supplying power. The video microscope may be constructed by adding a Wi-Fi AP board and a battery to a conventional inspector microscope. The display device has software for detecting when the endface is focused. Once the endface is focused, the display device emits an audio signal to alert the operator, who may then trigger the display device to analyze the endface image using an endface analysis software or save it to a folder, or transmit the image to a remote server.

15 Claims, 9 Drawing Sheets

USER-FRIENDLY WIRELESS FIBER OPTIC ENDFACE INSPECTOR

BACKGROUND OF THE INVENTION

1. Field of the Invention

This invention relates generally to inspecting fiber optic endfaces using video microscopes. More particularly, the invention relates to a fiber optic endface inspector having capabilities of wireless communication between its video microscope and its display device for transmitting video streaming signal of the endface image, and focus detection and automatic capture/analysis of focused image of the endface inspected.

2. Description of the Related Art

Dirt, dust and other contaminants are enemies of high-speed data transmission over optical fiber. Today's network applications require more bandwidth, making loss budgets tighter than ever. It is critical that all optical connections are clean and free of contaminants to ensure success of the applications. In the art of fiber optic endface inspection, video microscopes have been widely adopted as the primary tool in current fiber optic system installation and troubleshooting routines.

Figure 1A:
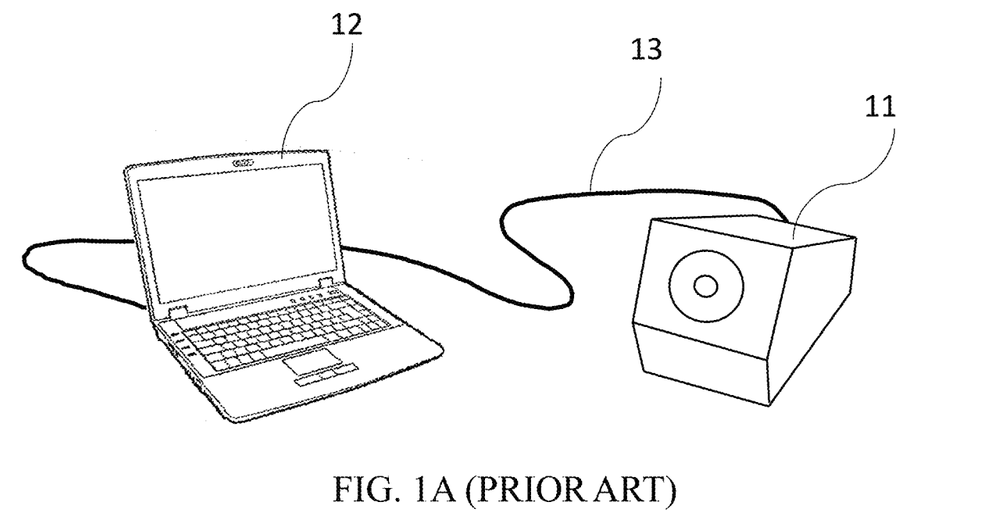
FIG. 1A illustrates a conventional bench-top microscope connected to a computer display via a cable.
Figure 1B:
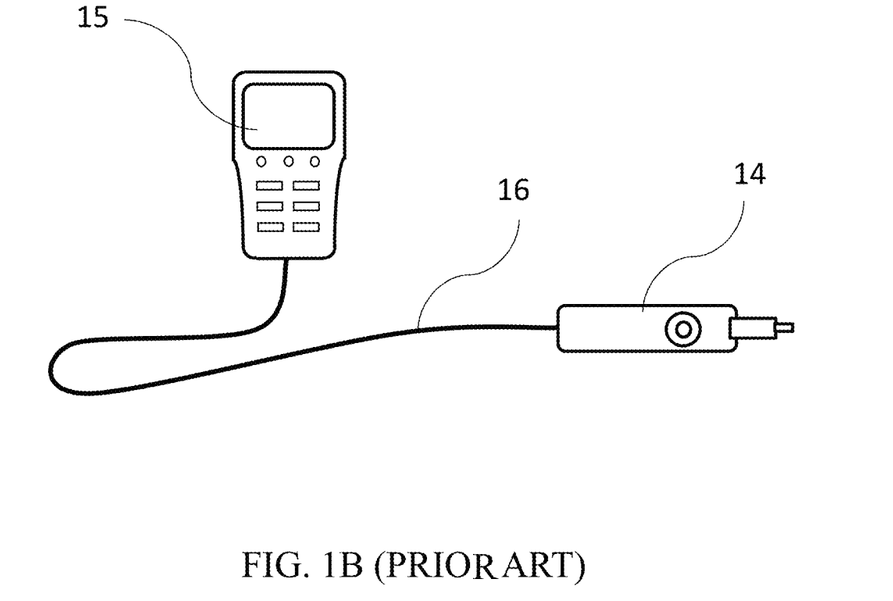
FIG. 1B illustrates a conventional hand-held microscope probe connected to a portable display unit via a cable.

Available fiber optic video inspection microscopes in today's market are mainly in two categories; bench-top and hand-held, as shown in FIG. 1A and FIG. 1B, respectively. FIG. 1A illustrates that the bench-top microscope 11 is mostly connected to a computer 12 via a cable 13 to inspect free fiber ends (i.e. male ends), for example, the endfaces of fiber patch cords. Using a computer program, operators can watch, capture, and save fiber images. But this type of microscopes is not suitable for field or central office uses, where both male and female (in-adapter) ends need to be inspected and most of the ends cannot be moved or removed. Thus, hand-held inspectors have become the choice for installers or maintenance technicians who work at fiber optic CO/HE, FTTX networks, or fiber sensing networks.

As illustrated in FIG. 1B, a hand-held video inspector includes two primary parts: a microscope probe 14 and a display unit 15. The display unit 15 can be a simple LCD screen, an OTDR device, a smart phone, a tablet or a PC. The microscope probe 14 and the display unit 15 are connected via a long electrical cable 16. As the first primary part, the microscope probe 14 is typically a compact and ergonomic hand tool that allows the operator to easily access locales that are a little distant away or difficult to access. With this flexibility, instead of bringing a connector to the microscope, which often is not feasible or possible, a hand-held video inspector can work with connectors that are affixed in a position and not movable. Most 'female' connectors belong to this category. With specially designed adapting tips for the hand-held video inspector probe, not only male connectors but also female connectors can be easily accessed and inspected. As different adapting tips should be mounted onto the microscope probe for interfacing with different connectors, manufacturers of hand-held video inspectors often offer a large family of adapting tips, with different ferrule sizes, different polishes (AC or APC), and different genders (male or female). As the second primary part, the display unit 15 receives the video signal from the microscope probe 14 and displays the fiber endface images on its screen. If the display unit 15 possesses a microprocessor inside, e.g. in an OTDR device, smart phone, or tablet/PC, the images can even be processed and saved. As a physically separate unit from the microscope probe 14, the display unit 15 can be positioned not only a little distant from the connector position but also set at any favorite viewing angle.

Among commercial hand-held video inspectors, in order to allow a long reach of the microscope probe, the cable between the microscope probe and the display is typically at least 1.5 meters long. Such a cable connection often causes inconveniences to the operators, especially when they work in a crowded environment (e.g. around a densely distributed connector panel) or an awkward position (e.g. in aircraft or shipboard applications). Therefore, a wireless communication between the microscope probe and the display unit will eliminate the drawbacks of the wired fiber optic endface inspector mentioned above and enable the operator to work more efficiently.

The U.S. Patent Application Publication by Levin et al, US 2011/0085159 A1, proposed a fiber optic connector endface inspection probe that comprises a wireless transceiver. But the wireless function of their proposed probe is just sending saved images (photos) to a remote image viewing device. Under its 'blind' working condition (i.e. without a real time video monitoring in front of the operator), a built-in autofocus system has to be provided in this proposal. The elements in their autofocus system include a microprocessor, an electronics module and a motor with controller, and are responsible for image contrast analysis, focusing status judgment, and then sending driving signal to the motor for lens position adjustments. Other than these elements, the proposed probe should also enclose a wireless transceiver, a battery, and a memory card. As a result, this probe becomes fairly bulky, heavy and impractical. As an alternative, instead of autofocus, Levin et al also proposed a manually focusing approach. But in that approach a viewing screen and thus a higher battery power have to be built in, so that the probe ends up even bulkier and heavier.

In view of the drawbacks and deficiencies of the fiber optic endface inspectors currently available in the industry, there is an urgent need for improvements on fiber optic endface inspectors to make the task of endface inspection easier and less time-consuming.

SUMMARY OF THE INVENTION

A wireless endface inspector according to the present application comprises a video microscope and a display device, wherein the video microscope includes a microscope optical system, an adapting tip for interfacing a fiber optic endface, an LED light source, a camera module for receiving image of the fiber optic endface interfaced by the adapting tip and converting the endface image into video streaming signal, a Wi-Fi AP (access point) board for enabling Wi-Fi communication, and a battery for supplying power. The wireless endface inspector is capable of wirelessly transmitting the video streaming signal of the endface image in real-time to the display device.

The video microscope for the wireless inspector of this application can be a bench-top microscope or a microscope probe, both of which may be obtained by adding a Wi-Fi AP board and a battery to a conventional bench-top microscope and a hand-held microscope probe, respectively.

The display device has a display screen and is Wi-Fi enabled for receiving the video streaming signal of the endface image transmitted from the video microscope for display on the display screen.

The display device is provided with a focus detection software, which, while the focusing knob on the video microscope is being turned, continuously analyzes the video streaming signal received (according to the contrast in the endface image) in order to detect whether the endface being interfaced for inspection is in focus of the camera module. Once the focused endface image is detected, the display device captures the focused image into a buffer and emits an audio signal to alert the operator. The operator may wirelessly instruct the display device (by pressing a 'Save' button on the video microscope) to save the focused image into a predefined file folder for later evaluation.

Further, the focused image captured in the display can be analyzed by a fiber endface quality analysis software, locally or remotely, to determine whether the endface passes or fails inspection. The display device of the wireless endface inspector itself may be provided with an endface quality analysis software and it will automatically analyze the endface quality upon detecting the focused image. Or, the operator may send the focused image captured in the display device to a remote server for endface quality analysis.

With the focus detection software and/or the endface quality analysis software, the operator of the wireless endface inspector need not view the image displayed on the display device. The focused image of each endface may be evaluated for pass or fail on the spot or analyzed later or even at a remote server. Therefore, the operator does not have to take the display device around while inspecting the endfaces, which may well spread around at different locations in the same general area. As a result, the operator may discharge his or her endface inspection job more efficiently and less strenuously.

DETAILED DESCRIPTION OF THE INVENTION

The objective of the present invention is to provide a practical and user-friendly wireless microscope inspector. Instead of transmitting still images, it directly transmits video streaming in real-time to the target display(s) or the target terminal(s).

Among today's wireless technologies, both Bluetooth and Wi-Fi have been extremely useful and widespread in homes, businesses, government, and in virtually every aspect of life. Bluetooth's main application is to temporarily link individual's personal devices together over short distances, while Wi-Fi is often used to link multiple computers together over longer distances. From the application nature of fiber optic endface inspectors, Bluetooth seems a good fit. However, even with the advanced versions Bluetooth 3.0 or 4.0 (so-called up to 24 Mbps), their real speed throughput can only reach about 2.1 Mbps max, which will definitely constrain the video stream transmission and thus the video frame size. With a minimum requirement of frame rate (24 fps), Bluetooth's slow speed may only be able to support a frame size of 320×160 max—even after an MJPEG data compression of >10:1. But a fiber optic endface inspection requires at least a VGA size (640×480) in order to guarantee the image quality of fiber endfaces without missing any miniature details. Therefore Wi-Fi is likely a more suitable approach.

Wi-Fi is one of the most ubiquitous wireless communications technologies in use today. Wi-Fi was originally designed as a way of extending internet connections wirelessly within an enterprise. However people soon began installing Wi-Fi Access Points ("AP" or hot spots) at home and in public Hotspots to give convenient internet access to laptops, which ended up having Wi-Fi chips installed as standard. Today there are hundreds of millions of devices which use Wi-Fi including tablets, smart phones, smart TVs and set tops. There are millions of public hotspots and many hundreds of millions of home and enterprise access points. The name Wi-Fi is reserved for the IEEE 802.11 standards—so far a, b, g and n, with more (ac, ad) on the way, and use 2.4 GHz and 5 GHz unlicensed spectrum bands, with more being considered up to 60 GHz. Wi-Fi reach varies with the power of the signal and the spectrum used, but will typically reach a few hundred feet and current generation devices will provide between 50 Mbps and a 100 Mbps shared between connected users. This data transfer is at least 20 times higher than Bluetooth, and possible for delivering live video stream with frame size much better than VGA. with high bandwidth (up to 150 Mpbs) and compact size (as small as 10 mm×10 mm) were not available until the recent 1 to 2 years. These chips have offered the developers a great opportunity to develop wireless mini-size video devices; for example, a wireless fiber optic endface microscope in the present invention.

Figure 2A:
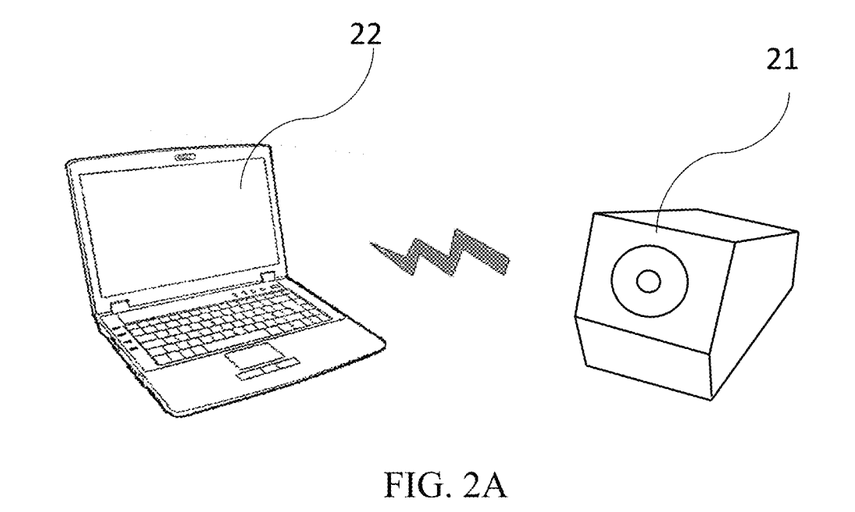
FIG. 2A illustrates wireless communication between a table-top microscope and a display computer according to the present application.
Figure 2B:
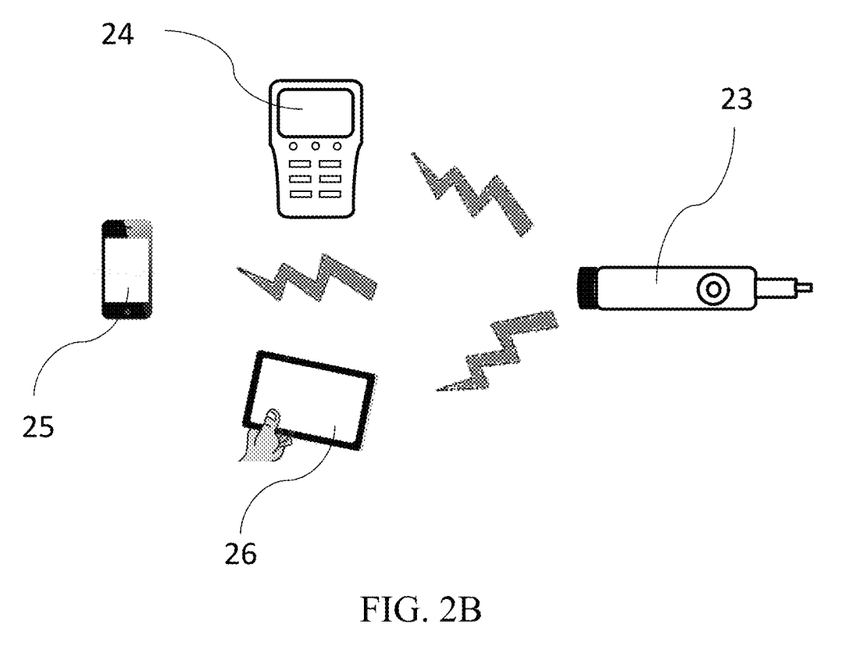
FIG. 2B illustrates wireless communication between a hand-held microscope probe and various display devices according to the present application.

A wireless communication between the fiber optic microscope endface inspector and the display device is implemented in this invention as shown in FIG. 2A and FIG. 2B. In FIG. 2A, the bench-top microscope 21 and the display computer 22 are now communicating wirelessly. Like the concept of wireless PC keyboards and mouse, by omitting a connection cable, this wireless bench-top inspector becomes more user-friendly. In FIG. 2B, the wireless microscope probe 23 is wirelessly communicating with various display devices, such as an OTDR device 24, a smart phone 25, a tablet 26, and so on.

Figure 2C:
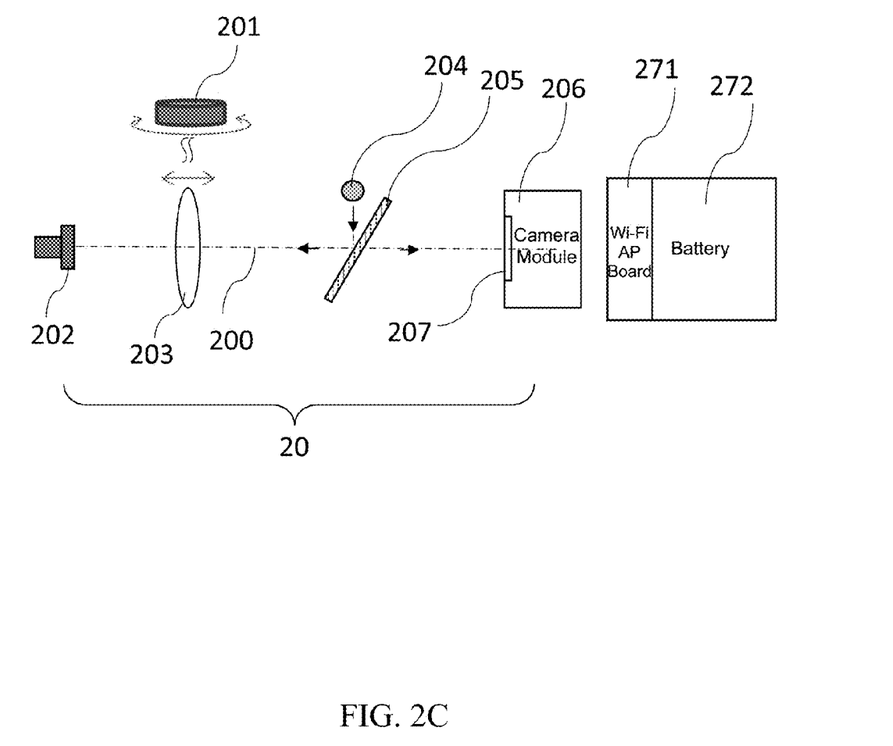
FIG. 2C illustrates the essential components of a wireless bench-top microscope or a wireless hand-held microscope probe.

FIG. 2C illustrates the essential components of the wireless bench-top microscope 21 or the wireless hand-held microscope probe 23. According to the present application, the bench-top microscope 21 and the hand-held microscope probe 23 both comprise a microscope optical system 203, an adapting tip 202 for interfacing a fiber endface (not shown), an LED light source 204 for optical illumination and a beam splitter 205 for guiding the illumination light to the fiber endface, a camera module 206 for receiving image of the fiber optic endface interfaced by the adapting tip and converting the endface image into digital video streaming signal, just like a conventional fiber optic endface inspector (20 in FIG. 2C). By rotating the focusing knob 201, the lens 203 can be driven to move back and forth along the optical axis 200 within a range a few millimeters and a position can be located where the object (the fiber endface under inspection) is focused right onto the image sensor 207 of the camera module 206.

The bench-top microscope 21 and the hand-held microscope probe 23 further include a Wi-Fi AP board 271 to enable wireless communication for transmitting the video streaming signal of the endface image in real-time.

In addition a battery 272 is also included in the bench-top microscope 21 or the hand-held microscope probe 23 as a power supply of the system, for powering the camera module 206, the LED light source 204, and the Wi-Fi AP board 271.

In fact, the wireless endface inspector (21,23) of the present invention may be implemented by adding a Wi-Fi AP board 271 and a battery 272 to a conventional fiber optic endface inspector 20, so that the video streaming signal of the endface image can be sent out wirelessly.

If the bench-top microscope 21 or the hand-held microscope probe 23 is converted from a conventional endface inspector 20 as mentioned above, the unit likely already has a USB port for wired communication with the display devices. Otherwise, the microscopes 21 and 23 can be provided with a USB port for optional wired connection to USB-enabled display devices. That way, via a USB cable, the operator can still use the microscopes as conventional wired inspectors if wireless communication is not crucial or feasible; for example, while using a display device that is not Wi-Fi enabled or while the battery is low that needs to be recharged.

Any display devices with Wi-Fi client functionality, such as iOS (iPhone, iPad, iPod touch), Android tablets, smart phones, smart TVs, PCs or special testing devices, can be used to receive the video streaming signal and display live images on its screen. Because of its wide bandwidth, this Wi-Fi AP can communicate to more than one client at the same time if needed. For example, in some cases the operator and his supervisor may want to inspect a fiber endface on their own displays separately and simultaneously.

Since most of such display devices possess a central processing unit (CPU) inside, they may also fulfill some basic image documentation jobs, such as image capturing, image saving/retrieving, file arrangement, etc. Further, by conducting simple calculations, the CPU may also be able to locate the fiber center position in the image and consequently draw the ABCD zones of this fiber. (See IEC 61300-3-35 standard, for polished endface of a connector.)

Figure 3:
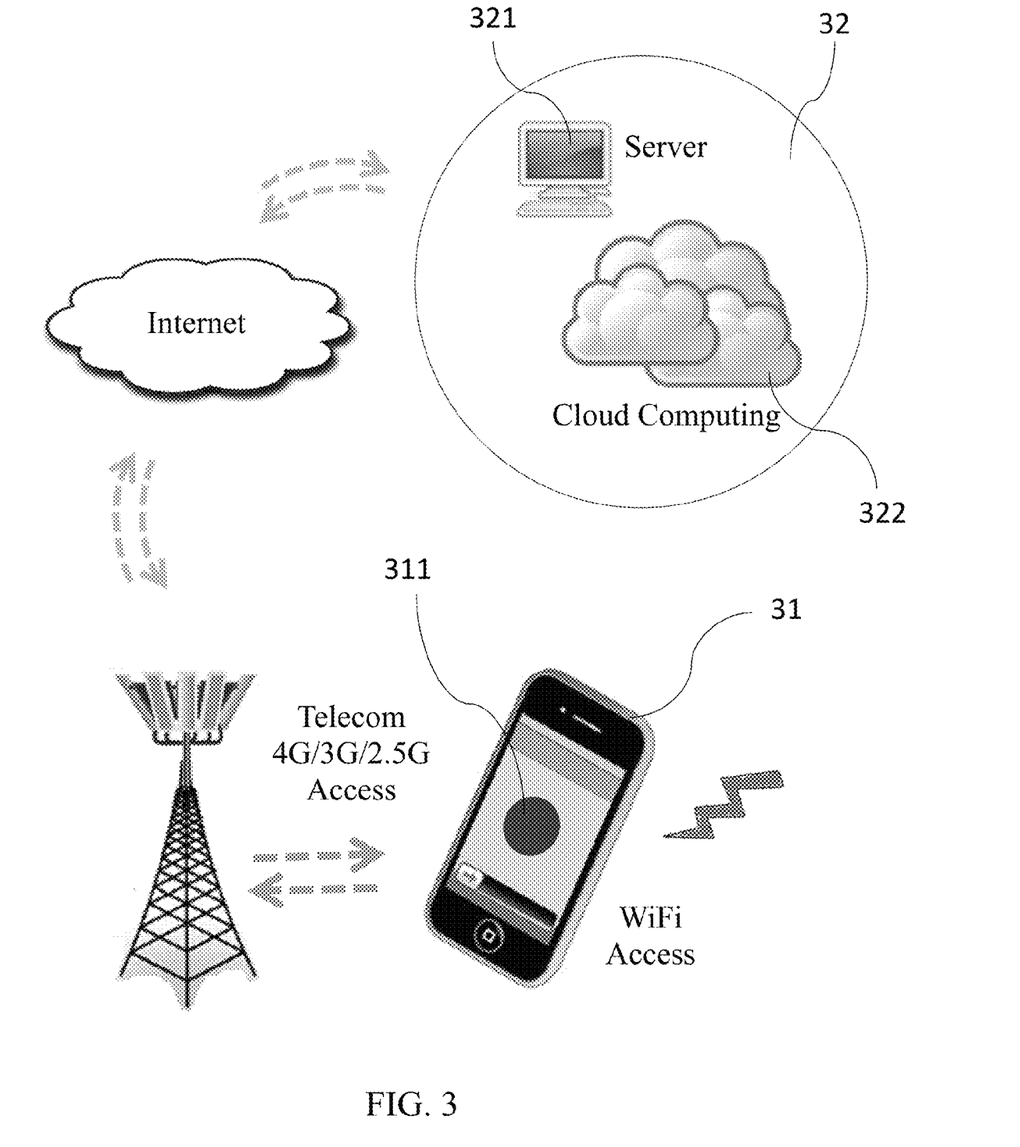
FIG. 3 illustrates that the display device can capture a focused fiber optic endface image and send it through the Internet to a designated server or a cloud computing provider for analysis and evaluation of the endface quality.

If the CPU is more powerful, the display device may even be able to accomplish a connector endface quality analysis and tell the operator a pass/fail result on the spot. Of course, if the CPU in the display is not capable of complicated calculations, it can still send the captured images to a specified service. Depending on the nature of the display device, the images can be further sent via Wi-Fi or 3G/4G mobile communication channels. For example, as illustrated in FIG. 3, an operator may use a smart phone 31 (or other types of display devices with Wi-Fi client functionality) to view the connector endfaces 311; in case he has any question on Go or No Go for the endface inspected, he can immediately capture an image and send it out to a designated service center 32 for a pass/fail evaluation. This service center 32 can be a specified server computer 321 (local or remote) with fiber endface quality analysis software. Alternatively, the service center 32 can be a cloud computing provider 322 providing fiber endface quality analysis service. It should be noted that if the operator is using Wi-Fi to send images out, the corresponding display device must support at least two Wi-Fi NICs (Network Interface Controller) because he needs one Wi-Fi channel specified with the inspection probe and another Wi-Fi channel for Internet connection. Once the endface quality analysis is finished, the service center 32 can transmit the analysis result back to the display device to be displayed or saved for other purposes.

For applications requiring a more direct set up and a higher degree of security, a Wi-Fi Direct scheme can be used instead of Wi-Fi. Wi-Fi Direct is able to make device-to-device connections with existing IEEE 802.11 a/b/g/n standard. It allows Wi-Fi devices (namely, the microscope probe 23 and the display devices 24, 25, 26 in FIG. 2B or the bench-top microscope 21 and the display computer 22 in FIG. 2A) talking to each other without prior setup and without the need for wireless access points (hot spots). Wi-Fi Direct embeds a software access point, or "soft AP", into the microscope (the host). When the display device enters the effective range of the Wi-Fi Direct host, the two will be connected through an ad-hoc protocol. The entire connection and setup can be as simple as Bluetooth, or even easier.

For wired inspector probes, the connection cable between the microscope probe and the display device takes two roles, i.e. transferring video imaging signals from the microscope probe to the display device and at the same time supplying electrical power from the display device to the microscope probe. Therefore in a wireless case, other than a Wi-Fi transmitter, a battery power supply must also be added on the probe side. This battery will support the camera module, the Wi-Fi transmitter circuitry, as well as the LED as an optical illuminator inside the microscope probe.

Figure 4A:
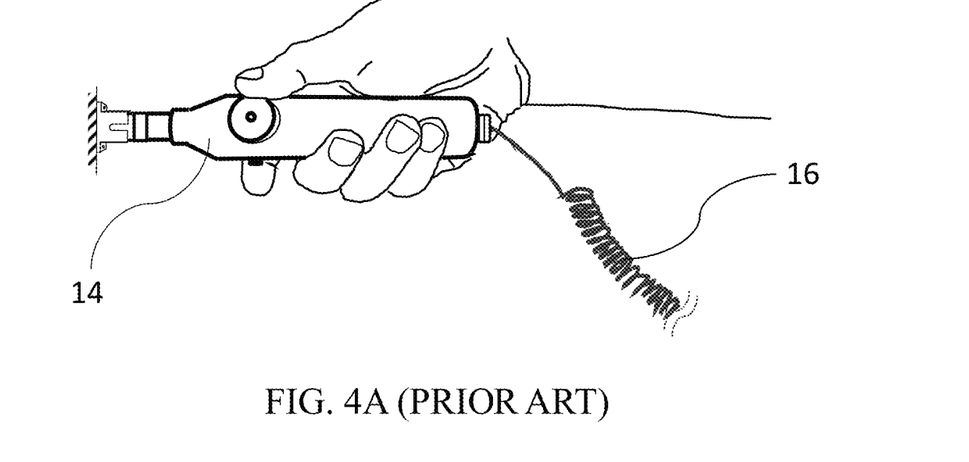
FIG. 4A shows a conventional hand-held microscope probe connected to a cable.
Figure 4B:
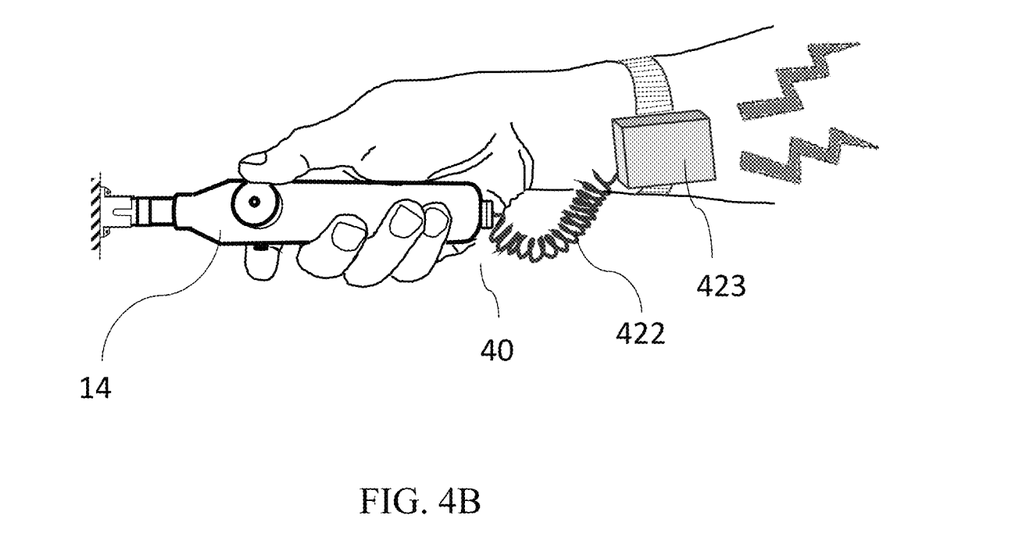
FIG. 4B shows a wireless microscope probe with the probe body connected to an external wireless transmitter disposed in a module (Wi-Fi module) wearable on a wrist.

Light weight and ergonomic shape are important to a hand-held product. So a preferred embodiment of the wireless microscope probe is proposed. In this embodiment, the probe body remains as a traditional wired one. From FIG. 4A and FIG. 4B, it can be seen that the probe body 14 of the wired probe (connected by a cable 16) in FIG. 4A and the probe body 14 of the wireless probe 40 in FIG. 4B are essentially identical in structure. To turn a wired probe into a wireless probe, one simply attaches a "watch" type Wi-Fi module 423 to the probe body 14 via a short cable 422. The "watch" type Wi-Fi module 423 comprises a mini Wi-Fi transmitter and a compact lithium ion battery. The operator wears this "watch" on his wrist while holding the probe body 14. In this case, the operator actually handles the probe in a similar way as he does with a wired probe. The only additional part, i.e. the Wi-Fi module 423, is totally supported by his wrist (or lower arm). Benefiting from the fast progress of today's IC and battery technologies, this Wi-Fi module 423 can be rather compact and well fit a human's wrist. Also, the module weight can be as light as 100 grams or even lower so that the operator may feel less loading than with the long cable while he was holding a wired probe.

Such a configuration offers users flexible operations. By connecting the probe body 14 with a relatively long cable 16 (through a USB port) or with a Wi-Fi module 423, one can easily set it to be a wired probe or a wireless probe.

Figure 5:
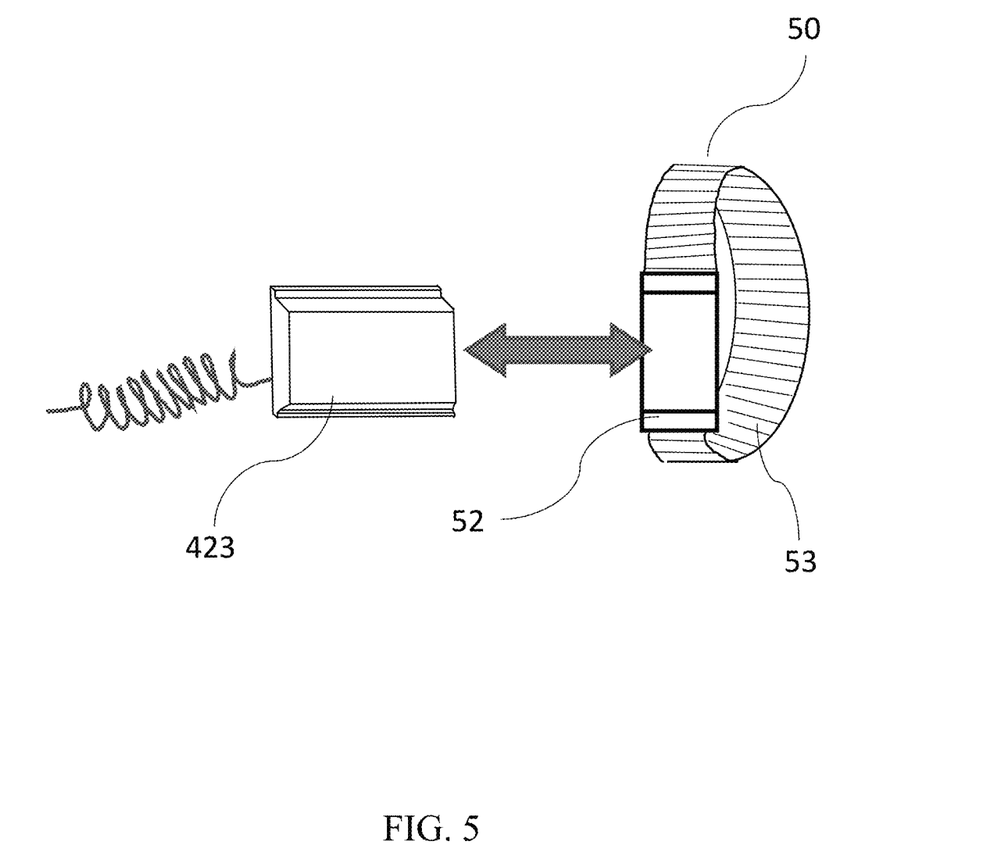
FIG. 5 illustrates a Wi-Fi transmission module which may be easily attached to and detached from a wrist strip.

In order to allow the operator to easily pick up and put down the inspector, the way of attaching the wireless module to human wrist is important. Several structures can be adopted, like a watch belt or an ESD (electrostatic discharge) wrist strip, with a metal expansion or a simple clip. FIG. 5 shows an embodiment that allows easy attaching and detaching of the wireless probe: a wrist strip 50 includes a belt 53 with a small frame piece 52 fixed in the middle thereof. The body of a Wi-Fi module 423 can easily slide onto this frame piece 52 and be locked (not shown). Reversely, by pressing the buckle (not shown), the Wi-Fi module 423 becomes unlocked and then can be quickly removed from the frame piece 52.

Figure 6:
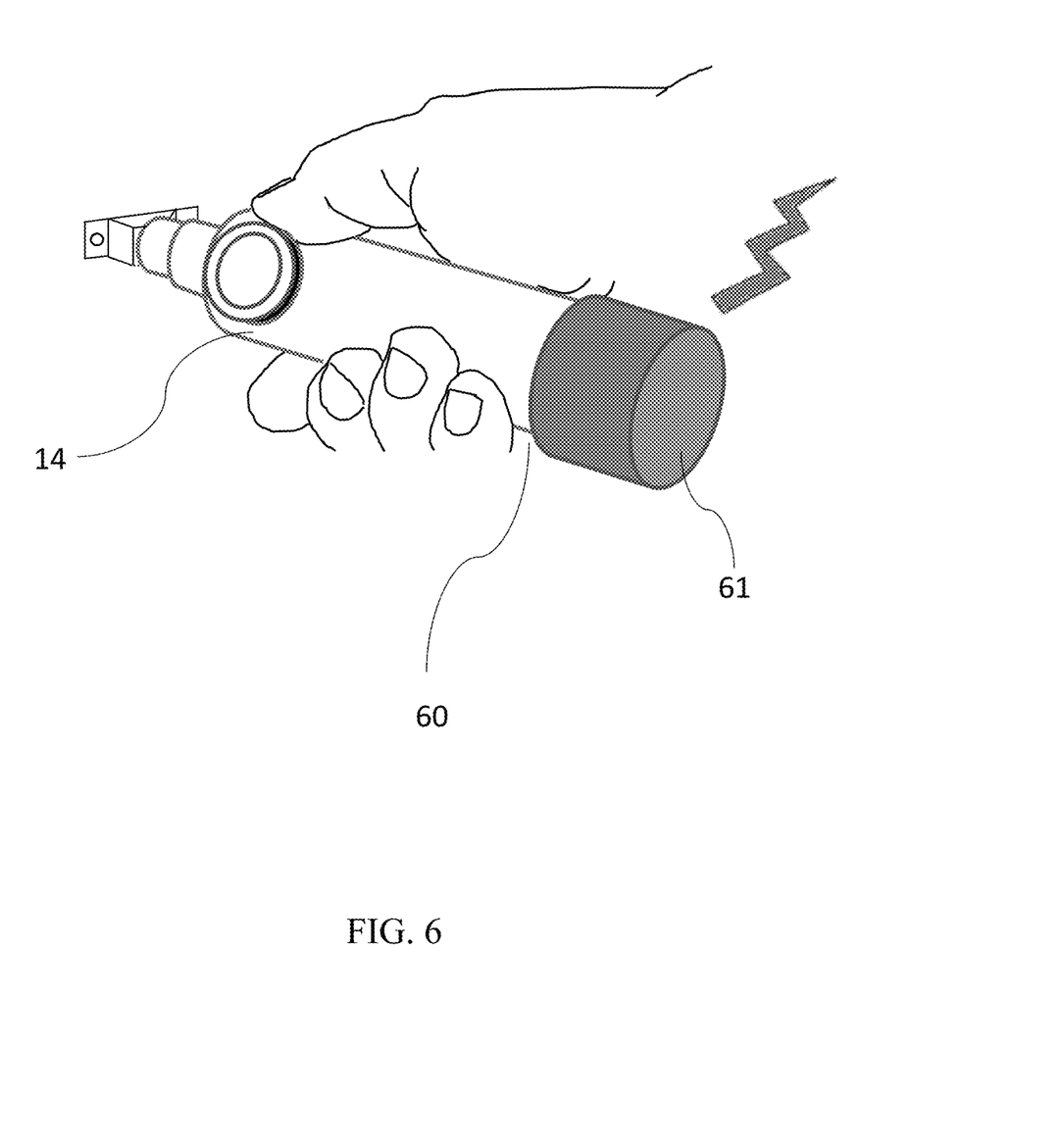
FIG. 6 illustrates another way to attach the Wi-Fi transmission module to the probe body, which may be a conventional endface inspector probe body.

FIG. 6 shows another embodiment of the present invention. Instead of connecting the wireless module via a short cable, the Wi-Fi module 61 is directly attached to the probe body 14 to construct a wireless inspector probe 60. This simplifies the overall structure; but in this case a smaller battery should be chosen in order to keep the probe compact and light. This embodiment is more suitable for applications where it is operationally permissible to use small batteries (thus rather short battery operating time).

Although the connecting cable has been eliminated in a wireless inspector, it seems that the operator's both hands are still occupied since he has to hold the probe and the display device, respectively. If he has to climb a ladder to reach connectors in a tall position, at least one hand should be freed. Besides, even if he can find a spot to set down or hang up the display device nearby; but due to the distance or the viewing angle, he may still not be able to view the screen as clearly as when the screen is right in front of him. As a result, he will not be able to clearly monitor the focusing status of the microscope. To resolve such a problem, the following is proposed in this invention.

Figure 7:
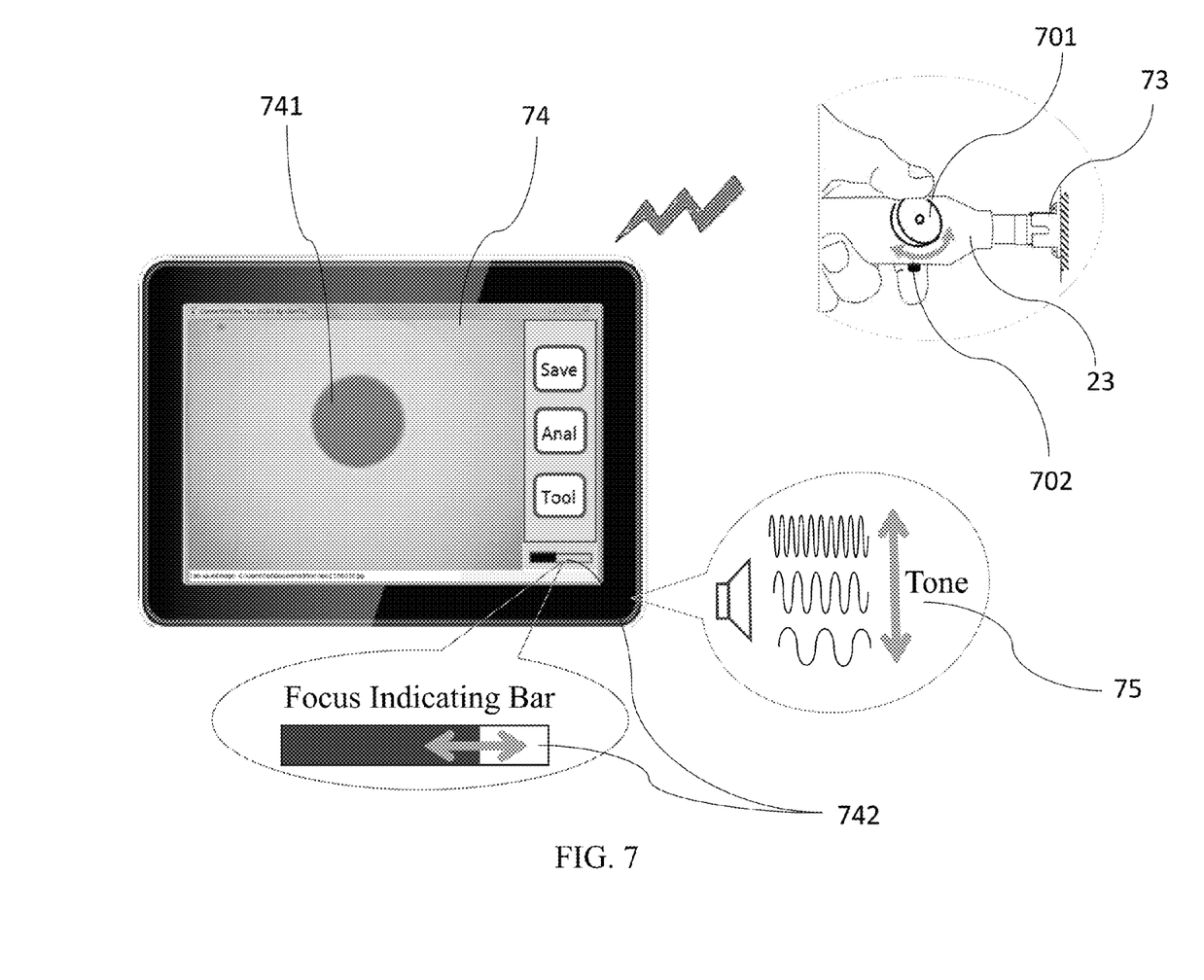
FIG. 7 illustrates the operation of a focus detection program to help the operator focus the microscope probe on the endface without viewing the endface image on the display device.

First of all, make sure that the display CPU is capable of simple computing. As illustrated in FIG. 7, when the microscope probe 23 (which may be 40 in FIG. 4B or 60 in FIG. 6) is aligned to a connector 73, at first an unfocused fiber endface image 741 is displayed on the screen 74. While the focusing knob 701 is continuously tuned, the endface image will be continually streamed to the display device 70 and the endface image should change with different degrees of focusing. A focus detection program may be installed with the display device 70 to help the operator focus the microscope on the endface. Several techniques for detecting the best focus (say, focusing peak) are known in the art. Only the method of "contrast detection" is introduced here although other methods may also be applied.

The method of "contrast detection" is based on the fact that in a given image, different pixels display different levels of brightness (or intensity). With a 0-255 shade greyscale, each pixel corresponds to a brightness value within the 0-255 range. The method includes the steps: (1) In the image, designate a zone which covers high and low brightness values, i.e. a zone with non-zero contrast. (2) Calculate the difference in brightness value between two adjacent pixels, i.e. the local brightness differential (or local contrast). When the object is well-focused, the local brightness differential should be at a maximum. (3) Add up all the local brightness differentials in the defined zone. When the sum (i.e. total brightness differential or simply "overall contrast") reaches a highest point the object should be in the best focus.

By simultaneously calculating and comparing the total brightness differential (or total contrast) over the designated zone while rotating the focusing knob 701, the focus detection program can map a focusing degree versus the focusing knob position, based on which a focusing indicator can be established. The maximum total brightness differential corresponds to the best focusing (focusing peak). As shown in FIG. 7, this indicator can be presented as a visible focus indicating bar 742 on the screen and/or designed as an audio signal 75, for example, with a pitch or a beep frequency varying with the degree of focusing. According to the filling percentage of the focus indicating bar 742 and/or the pitch (or the beep frequency) of the audio signal 75, the operator can readily chase the focusing peak. Once the focusing peak is reached, the operator will be notified of such, for example, by the focus indicating bar 742 displaying a message and/or the audio signal 75 launching a 'focus OK' sound. At that instant, the endface image corresponding to the focusing peak will be captured and accessible in a memory buffer of the display device 70. If the operator wants to save the current focused image, a 'Save' button 702 on the microscope probe 40/60 may be pressed to send a trigger signal to the display device 70 and the endface image corresponding to the focusing peak (captured and accessible in the memory buffer of the display device 70) will be saved into a predefined folder.

It can be seen that, by using the audio focus indicator, the operator can easily reach the focus point without looking at the screen. Further, if the CPU is powerful enough to also perform an endface pass/fail analysis, the operator's job becomes even simpler. Once the image reaches the focusing peak, the display device 70, using an endface quality analysis program, will automatically analyze the fiber endface quality. After the analysis is finished, a sound (or musical tune) indicating pass or fail will be launched, which may last for a few seconds (with a preset duration). After this sound stops, the program is ready for a next inspection. If the operator wants to save the current image with the analysis result, a 'Save' button 702 on the microscope probe 40/60 may be pressed to send a trigger signal to the display device 70 and the endface image corresponding to the focusing peak (captured and accessible in the memory buffer of the display device 70) with the analysis result will be saved into a predefined file folder.

Figure 8:
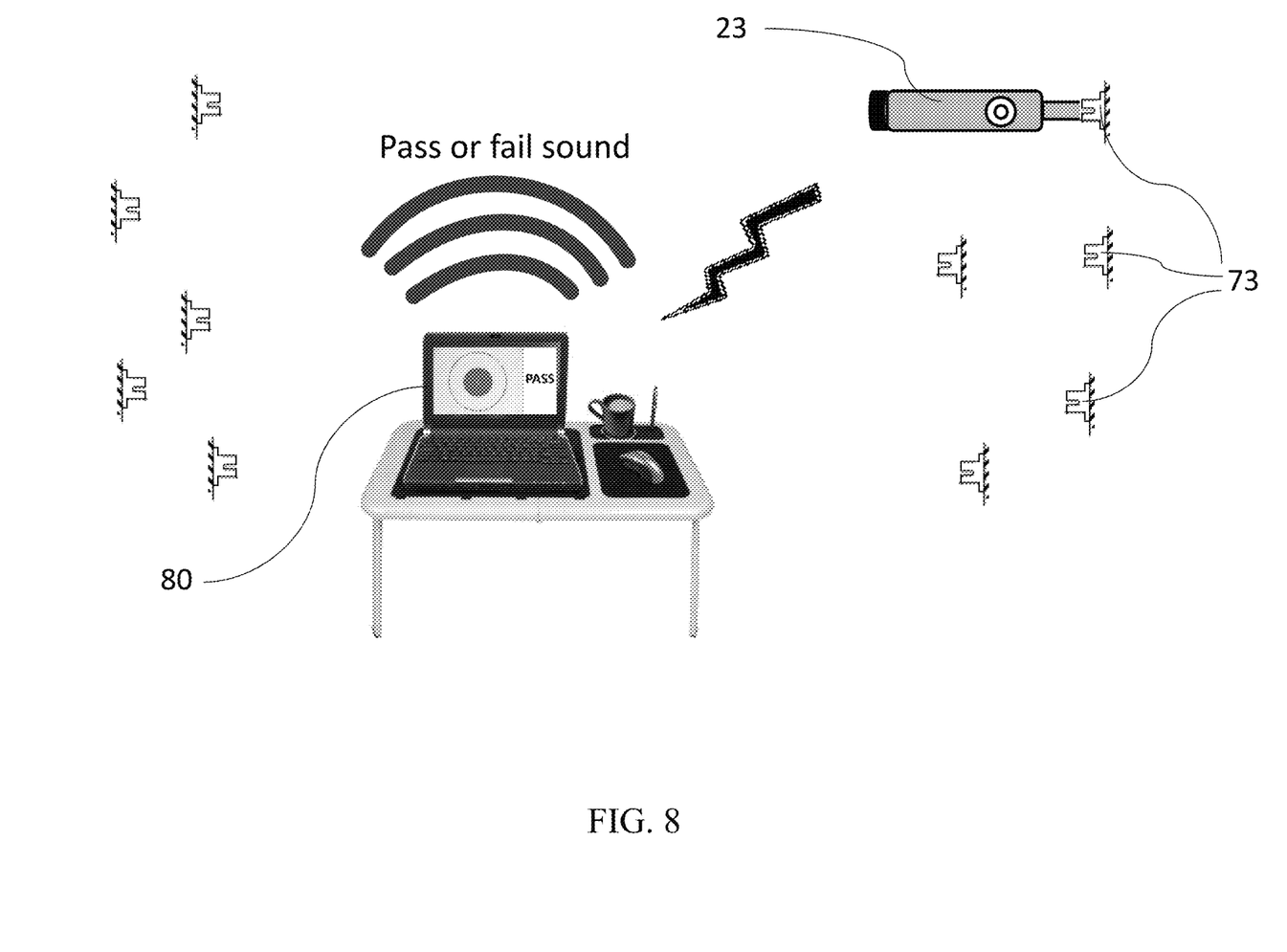
FIG. 8 illustrates the flexibility in operating the wireless microscope probe by leaving the display device in a more or less fixed position while the operator moves around in the surrounding area to inspect fiber optic endfaces.

It can be seen that the operator does not need to look at the screen at all, from the beginning to the end of the entire inspection process. It means that the display device can be placed anywhere within his hearing distance. FIG. 8 shows an example wherein a PC 80 placed on a table is used as the wireless display device. This PC 80 can remotely support the operator to inspect connectors anywhere in the room.

Two more points are worth mentioning: (a) Upon hearing a 'focus OK' sound, the operator is allowed to immediately release the microscope probe 23 from the target connector 73. In other words, the operator does not need to keep holding the probe in position while waiting for the analysis to finish. This is because the analysis is actually based on a captured endface image: as mentioned earlier, upon reaching the 'focusing OK' point, the focus detection program automatically captures an image into its buffer and starts the analysis calculations based on the captured image. So after the capturing point, any change on the live scene is no longer relevant. (b) Furthermore, as mentioned above, after a pass/fail sound is heard, the operator can press the 'Save' button (702 in FIG. 7) on the probe 23 to save the endface image and the analysis result. Since the current image and the analysis result are still in the buffer, he can actually press the 'Save' button at any time and at any position as long as the next inspection cycle has not started. Owing to such flexibility, where the 'Save' button is located is not critical and does not have to be as shown in FIG. 7. For example, the 'Save' button can be located on the Wi-Fi transmission module (423 in FIG. 4B or FIG. 5) instead, so that any simple probe with no button can also be utilized in this application as long as the probe is connected to a Wi-Fi transmission module 423.

What is claimed is:

1. A fiber optic endface inspector, comprising:

a video microscope including a microscope optical system, an adapting tip for interfacing a fiber optic endface, an LED light source for illuminating the fiber optic endface interfaced by the adapting tip, a camera module for receiving image of the fiber optic endface and converting the endface image into video streaming signal, a Wi-Fi AP (access point) board for wirelessly transmitting the video streaming signal in real-time using a Wi-Fi protocol, and a battery for supplying power to the video microscope; and a display device which is Wi-Fi enabled for receiving the video streaming signal of the endface image transmitted from the video microscope and which has a display screen for displaying the video streaming signal of the endface image, wherein the microscope optical system, the LED light source and the camera module are enclosed in a main body;

the Wi-Fi AP board and the battery are enclosed in a Wi-Fi module external to the main body; and the Wi-Fi module is connected to the main body via a cable or directly plugged onto an end the main body.

2. The fiber optic endface inspector according to claim 1, wherein the video microscope is a bench-top type or a hand-held probe type.

3. The fiber optic endface inspector according to claim 1, wherein the Wi-Fi AP board is adapted for the video streaming signal of the endface image to be receivable by more than one display device.

4. The fiber optic endface inspector according to claim 1, wherein the display device is capable of selectively capturing a frame of the video streaming signal of the endface image and further transmitting the captured frame of the endface image to a remote server and is capable of receiving data from the remote server.

5. The fiber optic endface inspector according to claim 1, wherein the main body is a hand-held probe type;

the Wi-Fi module is connected to the main body via a cable; and the Wi-Fi module is capable of being attached onto or detached from a wrist band for an operator to wear around a wrist.

6. The fiber optic endface inspector according to claim 1, wherein the video microscope further includes a USB port for connecting the video microscope via a cable to a USB port on the display device to allow the video streaming signal of the endface image to be transmitted from the video microscope to the video device by wired communication.

7. The fiber optic endface inspector according to claim 1, wherein the Wi-Fi AP board is a Wi-Fi Direct AP board embedded with a soft AP for wirelessly transmitting the video streaming signal, and the display device is Wi-Fi Direct enabled for wirelessly receiving the video streaming signal.

8. A fiber optic endface inspector, comprising:

a video microscope including a microscope optical system, an adapting tip for interfacing a fiber optic endface, an LED light source for illuminating the fiber optic endface interfaced by the adapting tip, a camera module for receiving image of the fiber optic endface and converting the endface image into video streaming signal, a Wi-Fi AP (access point) board for wirelessly transmitting the video streaming signal in real-time using a Wi-Fi protocol, and a battery for supplying power to the video microscope; and a display device which is Wi-Fi enabled for receiving the video streaming signal of the endface image transmitted from the video microscope and which has a display screen for displaying the video streaming signal of the endface image, wherein the display device further comprises a focus detection software for analyzing frames of the video streaming signal of the endface image received and determining whether the endface is in focus on the microscope optical system; and when the endface is determined to be in focus the display device emits a preset audio signal to indicate such, and captures the corresponding focused endface image into a memory buffer of the display device.

9. The fiber optic endface inspector according to claim 8, wherein the focus detection software calculates a total of brightness differential over a selected zone in the endface image and determines whether the endface is in focus on the microscope optical system according to the calculated total of brightness differential.

10. The fiber optic endface inspector according to claim 8, wherein the display device saves the focused endface image captured in the memory buffer into a predefined file folder when a predesignated button on the video microscope or on the display device is pressed.

11. The fiber optic endface inspector according to claim 8, wherein the display device further comprises an endface quality analysis software for analyzing the focused endface image captured in the memory buffer to determine whether the endface passes or fails inspection; and the display device emits one of two preset audio signals depending on whether the endface passes or fails inspection.

12. The fiber optic endface inspector according to claim 11, wherein the display device saves the focused endface image captured in the memory buffer and the result from the endface quality analysis software into a predefined file folder when a predesignated button on the video microscope or on the display device is pressed.

13. The fiber optic endface inspector according to claim 8, wherein the display device is capable of further transmitting wirelessly the focused endface image captured in the memory buffer to a remote server for endface quality analysis to determine whether the endface passes or fails inspection;

the display device is adapted for receiving the result of the endface quality analysis transmitted wirelessly back from the remote server; and the display device emits one of two preset audio signals depending on whether the endface passes or fails inspection.

14. The fiber optic endface inspector according to claim 8, wherein the video microscope further includes a USB port for connecting the video microscope via a cable to a USB port on the display device to allow the video streaming signal of the endface image to be transmitted from the video microscope to the video device by wired communication.

15. The fiber optic endface inspector according to claim 8, wherein the Wi-Fi AP board is a Wi-Fi Direct AP board embedded with a soft AP for wirelessly transmitting the video streaming signal, and the display device is Wi-Fi Direct enabled for wirelessly receiving the video streaming signal.

* * * * *